United States Patent
Clark

(10) Patent No.: US 11,919,376 B1
(45) Date of Patent: Mar. 5, 2024

(54) SMART BAR LOCK

(71) Applicant: Alarm.com Incorporated, Tysons, VA (US)

(72) Inventor: Colby Kevin Clark, Provo, UT (US)

(73) Assignee: Alarm.com Incorporated, Tysons, VA (US)

( * ) Notice: Subject to any disclaimer, the term of this patent is extended or adjusted under 35 U.S.C. 154(b) by 1099 days.

(21) Appl. No.: 16/658,878

(22) Filed: Oct. 21, 2019

Related U.S. Application Data

(60) Provisional application No. 62/749,343, filed on Oct. 23, 2018.

(51) Int. Cl.
| | |
|---|---|
| *B60J 5/06* | (2006.01) |
| *E04H 12/18* | (2006.01) |
| *E05B 65/08* | (2006.01) |
| *E05C 19/00* | (2006.01) |
| *G07C 9/00* | (2020.01) |

(52) U.S. Cl.
CPC .............. *B60J 5/06* (2013.01); *E04H 12/187* (2013.01); *E05B 65/0888* (2013.01); *E05C 19/003* (2013.01); *G07C 9/00309* (2013.01); *G07C 9/00571* (2013.01)

(58) Field of Classification Search
CPC ........ E05B 65/00; E05B 65/0888; B60J 5/06; B60J 5/062; B60J 5/065; B60J 5/067; E04H 12/187; E05C 19/00; E05C 19/003–005; G07C 9/00; G07C 9/00309; G07C 9/00571

USPC ......................................................... 292/339
See application file for complete search history.

(56) References Cited

U.S. PATENT DOCUMENTS

| | | | | |
|---|---|---|---|---|
| 9,518,412 | B2* | 12/2016 | Moroz | ................... E05C 19/003 |
| 11,486,182 | B2 | 11/2022 | Xu | |
| 2014/0232120 | A1* | 8/2014 | Wolf | ..................... E05C 19/005 |
| | | | | 292/262 |

OTHER PUBLICATIONS

HomeDepot.com [online], "Defiant Aluminum Patio Door Security Bar," on or before Aug. 10, 2015, retrieved on Oct. 11, 2023, retrieved from URL<https://www.homedepot.com/p/Defiant-Aluminum-Patio-Door-Security-Bar-70622/205174139>, 2 pages.

* cited by examiner

*Primary Examiner* — Nathan Cumar
(74) *Attorney, Agent, or Firm* — Fish & Richardson P.C.

(57) ABSTRACT

A smart bar lock that includes a pole with a length that corresponds to a length of an area that a sliding portion of a sliding door slides along, a motorized hinge coupled to an end of the pole, where the motorized hinge is configured to rotate to the pole by the end of the pole, and a processor. The processor is configured to perform operations of determining to lock the sliding door, moving the pole from a vertical position into a horizontal position with the motorized hinge, determining to unlock the sliding door while leaving the sliding door closed, and moving the pole into the vertical position with the motorized hinge.

16 Claims, 5 Drawing Sheets

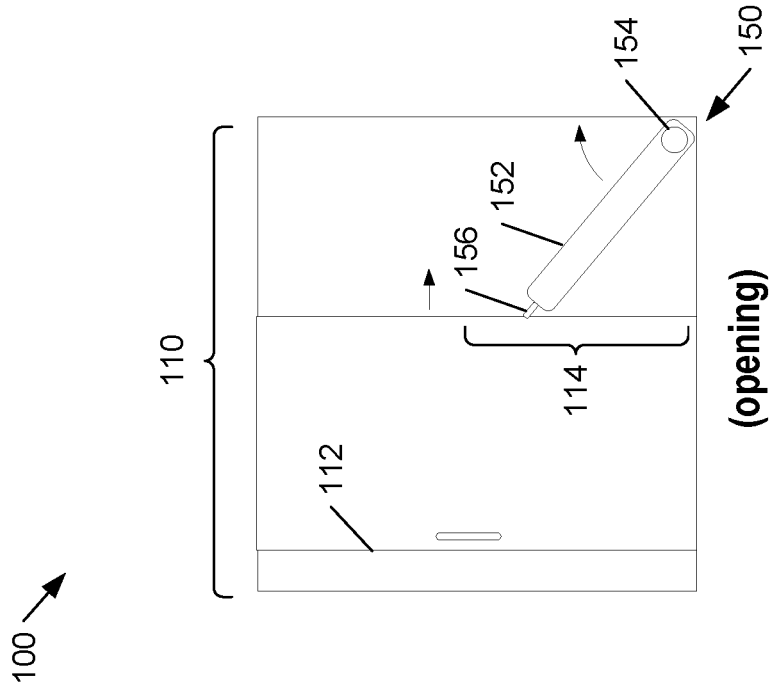
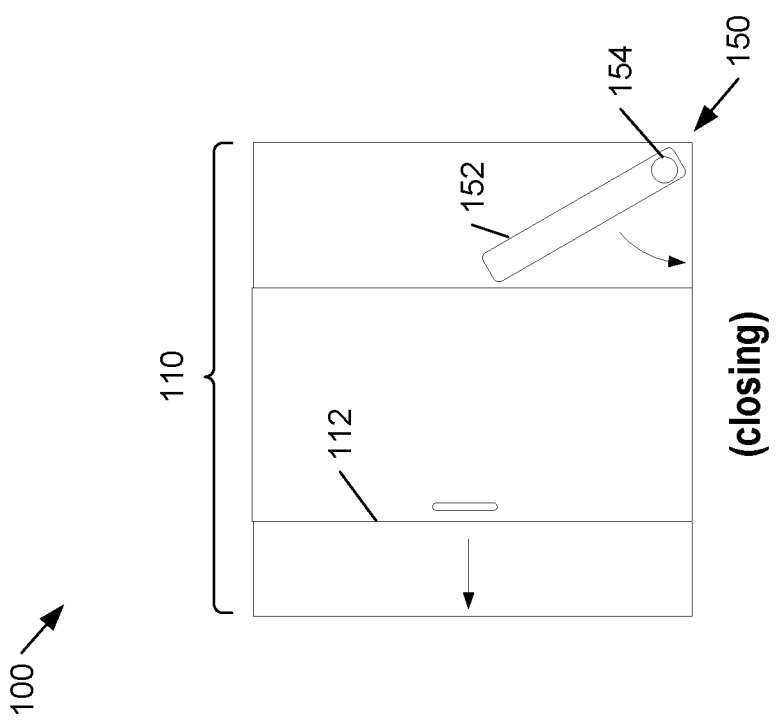

SMART BAR LOCK

CROSS-REFERENCE TO RELATED APPLICATIONS

This application claims the benefit of U.S. Provisional Application No. 62/749,343, filed Oct. 23, 2018, which is incorporated by reference in its entirety.

TECHNICAL FIELD

This disclosure relates to property monitoring technology.

BACKGROUND

Many homes include sliding doors that may be opened and closed by sliding the doors. Sliding doors may include a lock that latches onto a piece of a door frame to lock the door in place.

SUMMARY

Techniques are described for a smart bar lock. Sliding doors may be used in homes and offices. Some sliding doors may have locks. These locks may be a single latch hook that latches onto a piece in a door frame that sometime is not even metal. With a little horizontal force, the lock may be overcome and the door opened. For example, a hook may break or bend, or a wooden piece in the door frame may break off.

A solution that prevents a sliding door from being forced open may be laying a pole, e.g., a professionally manufactured pole or the handle off of an old broom, in the sliding door's track. With such a pole in place, even if the locking mechanism is overcome, the pole prevents the door from sliding open. However, this solution may have many shortcomings. For example, the pole lays on the floor and may be in the reach of children that could remove the pole, the locking and unlocking of the pole is a manual process where a person must be there and physically place the pole in the door's track or remove the pole from the tracks, when not in use the pole must be stored somewhere, and the pole can only be removed by someone inside that can physically reach the pole.

A smart bar lock may address the shortcomings of manually laying a pole in a sliding door's tracks while also preventing a sliding door from being forced open. Generally, the smart bar lock may include a pole on a motorized hinge that can rotate the pole between a horizontal position that blocks the door from sliding horizontally open and a vertical position that allows the door to slide open horizontally. Additionally or alternatively, the smart bar lock could also open and close the sliding door.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 1C and 1D illustrate an example of a smart bar lock closing and opening a sliding door.

Like reference symbols in the various drawings indicate like elements.

DETAILED DESCRIPTION

Figure 1B:
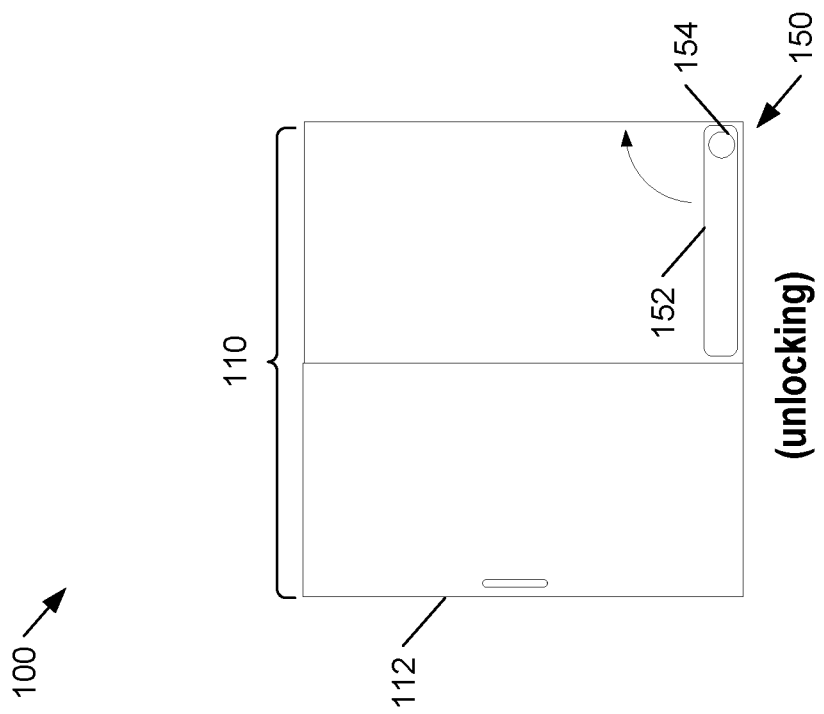
FIGS. 1A and 1B illustrate an example of a smart bar lock locking and unlocking a sliding door.
Figure 1A:
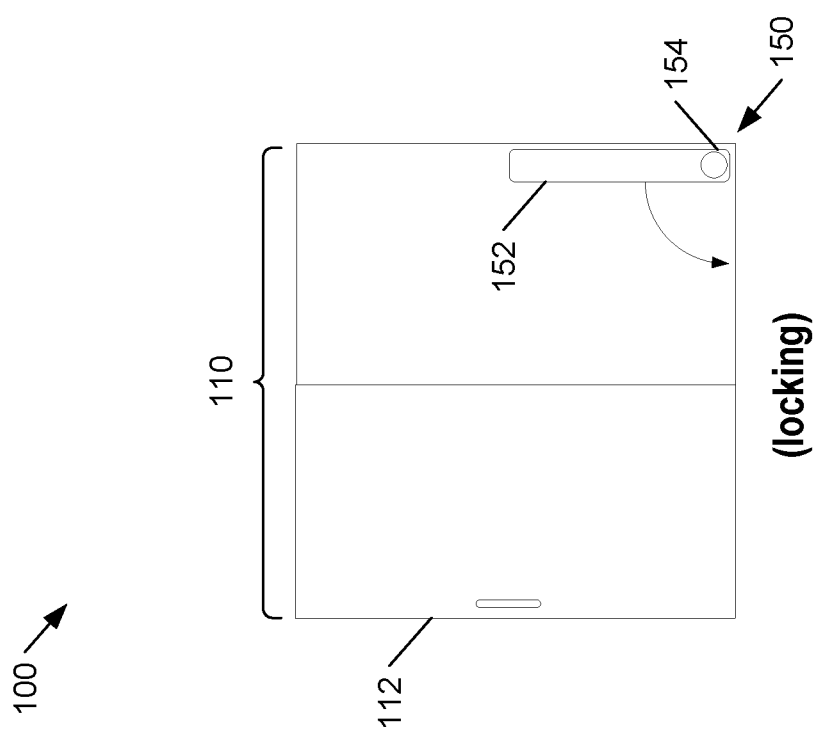

FIGS. 1A and 1B illustrate an example of a smart bar lock 150 locking and unlocking a sliding door 110. FIGS. 1A and 1B illustrate a system 100 that includes a sliding door 110. The sliding door 110 includes a sliding portion 112 and the smart bar lock 150. The sliding portion 112 may be slid horizontally across a track at the bottom of the sliding door 110 to open and close the sliding door 110.

The smart bar lock 150 may include a pole 152 and a motorized hinge 154. The pole 152 may be sized such that while the longest side of the pole 152 is horizontal in respect to the ground, the pole 152 is in contact with the sliding portion 112. Accordingly, while the pole 152 is in the horizontal position the pole 152 may prevent the sliding portion 112 from being slid to open the sliding door 110. The pole 152 may be further sized such that while the longest side of the pole 152 is vertical in respect to the ground, the pole 152 is not in contact at least while the sliding door 110 is closed. Accordingly, while the pole 152 is in the vertical position the pole 152 may not prevent the sliding portion 112 from being slid to open the sliding door 110.

The motorized hinge 154 may be configured to move the pole 152 between the horizontal position and the vertical position. For example, the motorized hinge 154 may rotate the pole 152 ninety degrees at a time between the horizontal position and the vertical position.

FIG. 1A illustrates the smart bar lock 150 where the pole 152 is vertical such that the sliding door 110 is unlocked and the motorized hinge 154 is beginning to rotate the pole 152 ninety degrees in a counter clockwise direction to lock the sliding door 110. FIG. 1B illustrates the smart bar lock 150 where the pole 152 is horizontal such that the sliding door 110 is locked and the motorized hinge 154 is beginning to rotate the pole 152 ninety degrees in a clockwise direction to unlock the sliding door 110.

FIGS. 1C and 1D illustrate an example of a smart bar lock closing and opening a sliding door. In FIG. 1C, the pole 152 may be rotated counterclockwise such that an end of the pole 152 opposite of the motorized hinge 154 pushes against the sliding door 110 and moves the sliding door 110 horizontally away from the motorized hinge 154 until the sliding door 110 is closed. In some implementations, the end of the pole 152 may include a roller, e.g., a wheel, which enables the pole 152 to more smoothly push the sliding door 110.

In FIG. 1D, the smart bar lock 150 is shown opening the sliding door 110. The pole 152 of the sliding door 110 may include a latch 156 that detachably connects to a portion of the sliding door 110 such that when the pole 152 is rotated clockwise the sliding door 110 is pulled open by the pole 152. For example, when the smart bar lock 150 is instructed to open the sliding door 110, the smart bar lock 150 may deploy the latch 156 to connect to the catch in the sliding door 110, then rotate the pole 152 clockwise until the pole 152 is in the vertical position and the sliding door 110 is pulled towards the smart bar lock 150, and once the pole 152 is in the vertical position, then disconnect the latch 156 from the catch so that the sliding door 110 can be manually closed by a person. In some implementations, the latch 156 may also rotate around the end of the pole 152 such that the latch is parallel to the ground and/or perpendicular to the height of the sliding door 110 while connected to the catch.

In some implementations, the latch 156 may connect to a catch in the sliding door 110 that slides along a vertical rail 114 also included in the sliding door 110. For example, the vertical rail 114 may be approximately the same length as the pole 152 and the catch may slide along the vertical rail 114. In other implementations, the vertical rail 114 itself may be the catch and the latch 156 may connect to the vertical rail 114 and slide along the vertical rail 114.

The latch 156 and catch may be configured so that when the smart bar lock 150 is in the closed position, the latch 156 is mechanically biased to automatically connect to the catch, e.g., the catch is a hole and the latch 156 is spring loaded to enter the hole. The latch 156 may include an actuator that disconnects the latch 156 from the catch. For example, when the smart bar lock 150 reaches the vertical position, the smart bar lock 150 may cause the actuator to disconnect the latch 156 from the catch.

In some implementations, the latch 156 may be configured so that a person can manually disconnect the latch 156 from the catch. For example, in the event of a power failure the latch 156 may need to be manually disconnected. Accordingly, the latch 156 may be configured to be able to be manually depressed by a person to disconnect the latch 156 from the catch. In another implementation, the latch 156 may not be mechanically biased so that the actuator keeps the latch 156 connected to the catch and if the actuator loses power the latch 156 is disconnected from the catch.

The smart bar lock 150 may determine how to move the pole 152 and actuate the latch 156 based on a current state of the smart bar lock 150 and the sliding door, and whether the sliding door 110 is to be locked, unlocked, opened, or closed. For example, when the smart bar lock 150 is to be locked, the smart bar lock 150 may simply move the pole 152 from the vertical position to the horizontal position.

When the smart bar lock 150 is to be unlocked from the locked state, the smart bar lock 150 may actuate the latch 156 to disconnect the latch 156 from the catch and then move the pole 152 from the horizontal position to the vertical position. When the smart bar lock 150 is to open the door, the smart bar lock 150 may determine that the smart bar lock 150 is in the locked state so it can move the pole 152 from the horizontal position to the vertical position and then disconnect the latch 156. Where the latch 156 is actuated to connect to the catch, the smart bar lock 150 may actuate the latch 156 after receiving an instruction to open and before moving the pole 152.

When the smart bar lock 150 is to open the door, the smart bar lock 150 may determine that the smart bar lock 150 is in the unlocked state and the door is only partially open and, in response, move the pole 152 from the vertical position to the horizontal position so that the latch 156 connects to the catch when the door is closed, then moves the pole 152 from the horizontal position to the vertical position and then disconnect the latch 156.

While FIGS. 1A-1D illustrate the smart bar lock 150 positioned in a bottom corner of the sliding door 110 furthest from the sliding portion 112, the smart bar lock 150 may also be positioned in other locations. For example, the smart bar lock 150 may be positioned in the upper corner of the sliding door 110 furthest from the sliding portion 112. Including the smart bar lock 150 in the upper corner may make installing and repairing the smart bar lock 150 more difficult but better ensure that objects may not obstruct the path of the pole 152 and make it more difficult for people or animals to manually move the pole 152. In yet another example, the smart bar lock 150 may be positioned at a height in the middle of the sliding door 110 and furthest from the sliding portion 112, e.g., between the lower corner and upper corner furthest from the sliding portions.

In some implementations, a sliding door may include two smart bar locks. For example, the sliding door may include a first smart bar lock in a bottom corner of the sliding door furthest from the sliding portion and a second smart bar lock positioned in the upper corner of the sliding door furthest from the sliding portion. Using two smart bar locks may provide even greater assurance that the sliding door may not be able to be forced open as poles of both smart bar locks may need to be overcome and may also provide redundancy as if one smart bar lock malfunctions and is stuck in the vertical position the other smart bar lock may still be able to move to the horizontal position to lock the sliding door. In some implementations, the smart bar lock 150 may incorporated into the sliding portion 112.

In some implementations, the smart bar lock 150 may further determine whether there are any obstructions in the path of the pole 152 and if there is an obstruction, provide a notification to a user of the obstruction. For example, the smart bar lock 150 may move the pole 152 to be closed but determine that before the pole 152 is in the horizontal position that the pole 152 cannot be rotated counter clockwise further. Accordingly, the smart bar lock 150 may provide a notification to a home monitoring system that the pole 152 is blocked, output an audible announcement of "Door cannot be locked as pole is being blocked," flash lights, or provide some other notification for a user and return the pole 152 to the horizontal position for the user to attempt to have the smart bar lock 150 close again later after the user clears the path of the pole 152. The smart bar lock 150 may similarly determine obstructions when unlocking, closing, or opening the sliding door 110. In another example, the smart bar lock 150 may include a light source used to determine whether a path of the pole 152 has obstructions.

In some implementations, the smart bar lock 150 may attempt to clear a path of the pole 152. For example, a toy may be at the bottom of the sliding door 110 along the path of the pole 152. Accordingly, the smart bar lock 150 may include a thin wire at the bottom of the sliding door and before the pole 152 is rotated to the closed position, the smart bar lock 150 may move the thin wire clockwise to attempt to lift any object away from the path of the pole 152, and then rotate the pole 152. In another example, the smart bar lock 150 may rotate the thin wire clockwise to attempt to lift any object away from the path of the pole 152 only after the pole 152 is already determined to be obstructed, e.g., as described above, and then re-attempt to rotate the pole 152.

In other implementations, the smart bar lock 150 may include a flat spring loaded shelf that sits flush with the bottom of the door and the sliding portion 112 slides over as it opens/closes. The shelf may be attached to the track via a long horizontal hinge or hinges that run the length of the sliding door's track. If it is determined that something is obstructing the smart bar lock 150 from closing, the spring loaded shelf may activate and throw/push objects off of the track (towards the viewer of FIGS. 1A-D).

Figure 2:
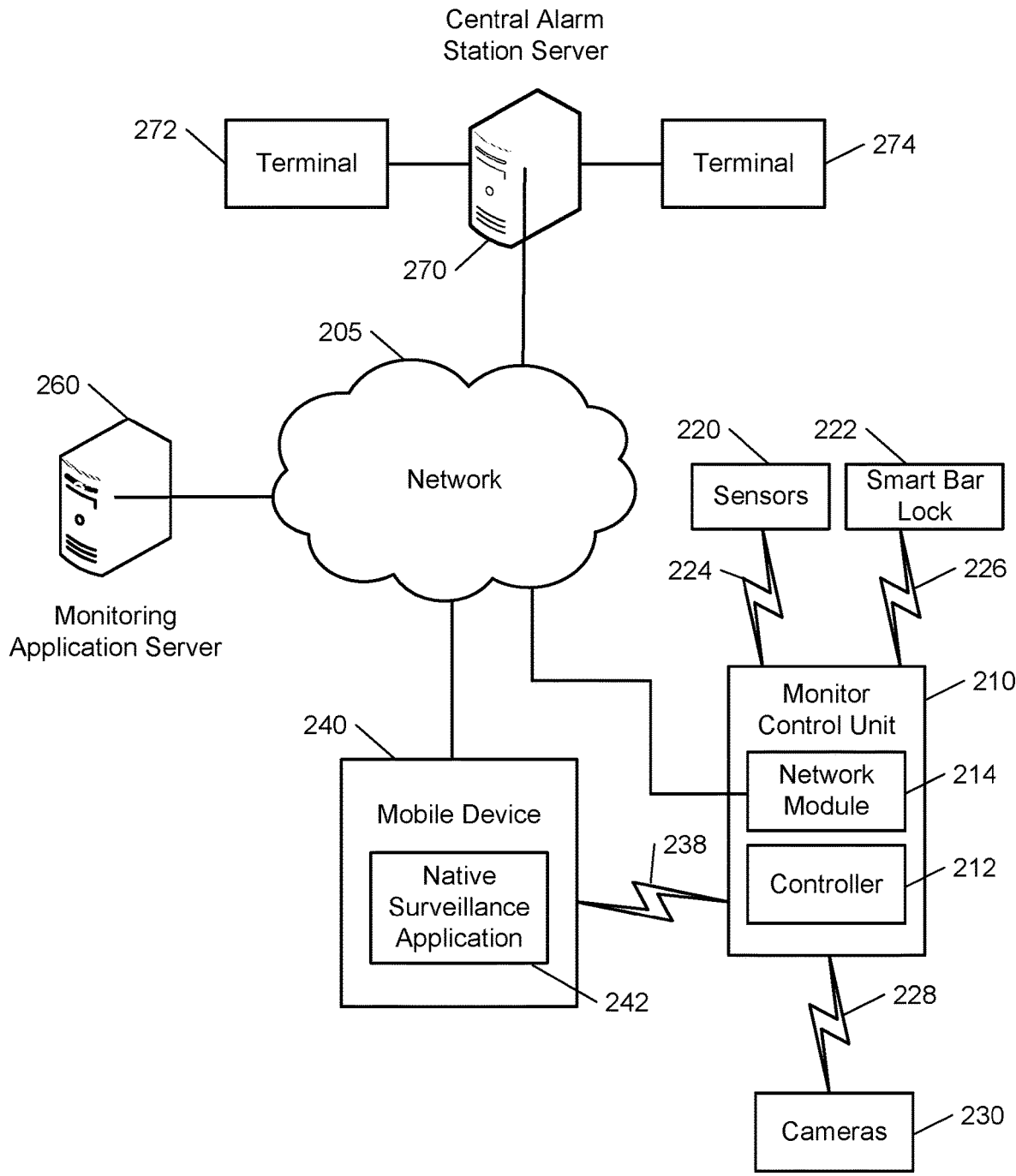
FIG. 2 illustrates another example of a monitoring system with a smart bar lock.

FIG. 2 illustrates an example of a system 200 configured to monitor a property. The system 200 includes a network 205, a monitor control unit 210, one or more user devices 240, and a monitoring application server 260. The network 205 facilitates communications between the monitor control unit 210, the one or more user devices 240, and the monitoring application server 260. The network 205 is configured to enable exchange of electronic communications between devices connected to the network 205. For example, the network 205 may be configured to enable exchange of electronic communications between the monitor control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitor control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitor control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system may also include one or more other cameras 230. Each of the one or more cameras 230 may be video/photographic cameras or other type of optical sensing device configured to capture images. For instance, the cameras may be configured to capture images of an area within a building monitored by the monitor control unit 210. The cameras may be configured to capture single, static images of the area and also video images of the area in which multiple images of the area are captured at a relatively high frequency (e.g., thirty images per second). The cameras may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The monitoring system may include the smart bar lock 222. The smart bar lock 222 may be similar to the smart bar lock 150 described in FIG. 1 above.

The sensors 220, the smart bar lock 222, and the cameras 230 communicate with the controller 212 over communication links 224, 226, and 228. The communication links 224, 226, and 228 may be a wired or wireless data pathway configured to transmit signals from the sensors 220, the smart bar lock 222, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitor control unit 210 to receive information regarding events (e.g., alarm events) detected by the monitor control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitor control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitor control unit 210 and perform the functions of the monitor control unit 210 for local monitoring and long range/offsite communication. Other arrangements and distribution of processing is possible and contemplated within the present disclosure.

Figure 3:
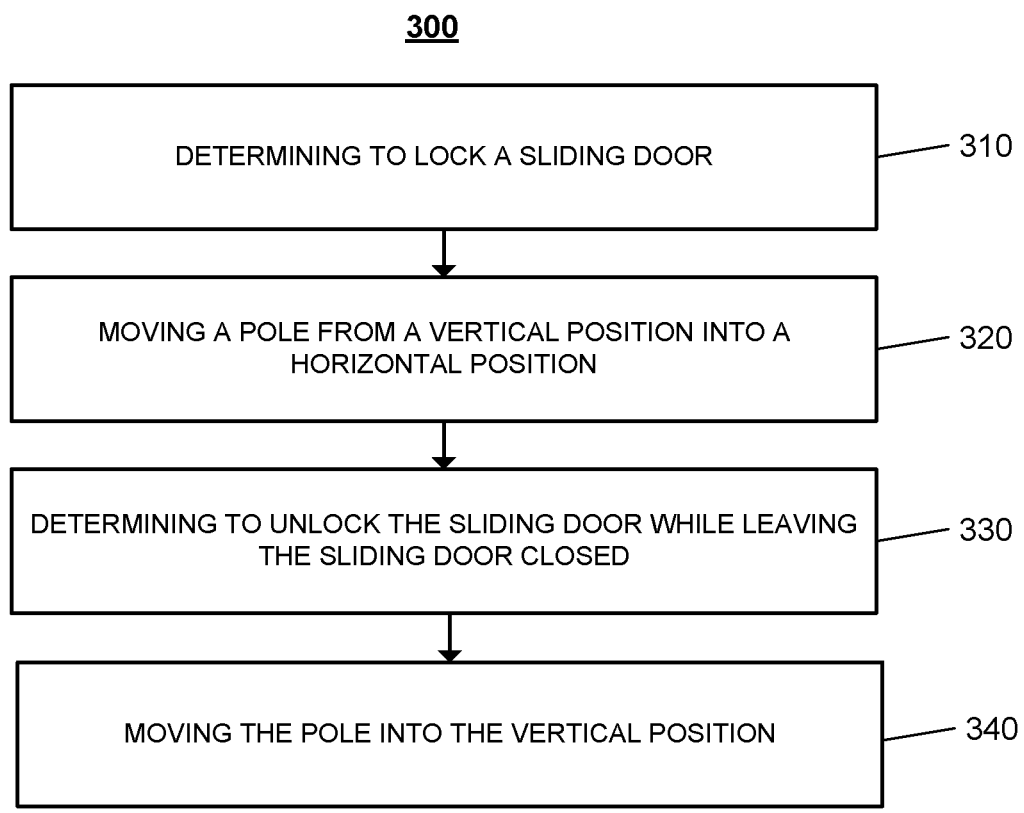
FIG. 3 is a flow chart of an example process for locking a sliding door with a smart bar lock.

FIG. 3 illustrates an example process 300 for locking a sliding door with a smart bar lock. The process 300 includes determining to lock a sliding door (310). For example, the smart bar lock 150 may receive an instruction to lock the sliding door 110. The process 300 includes moving a bar from a vertical position into a horizontal position (320). For example, in response to the instruction to lock the sliding door 110, the smart bar lock 150 may move the pole 152 from the vertical position to the horizontal position such that the sliding door 110 is locked shut. The process 300 includes determining to unlock the sliding door while leaving the sliding door closed. For example, the smart bar lock 150 may receive an instruction to unlock the sliding door 110 and, in response, actuate the latch 156 to disconnect the latch 156 from a catch in the sliding door 110. The process 300 includes moving the pole from the horizontal position to the vertical position (340). For example, after the smart bar lock 150 disconnects the latch 156 from the catch in the sliding door 110, the smart bar lock 150 may move the pole 152 into the vertical position.

Figure 4:
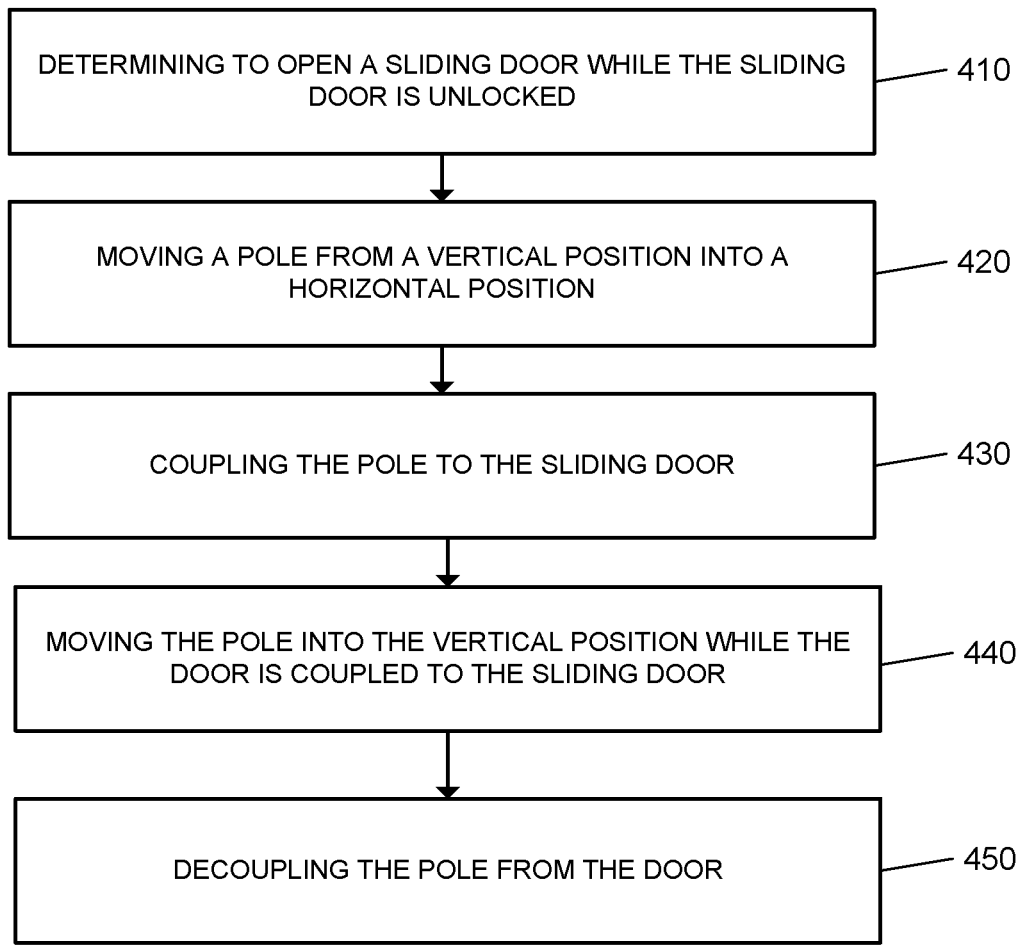
FIG. 4 is a flow chart of an example process for opening a sliding door with a smart bar lock.

FIG. 4 is a flow chart of an example process 400 for opening a sliding door with a smart bar lock. The process 400 includes determining to open a sliding door while the sliding door is unlocked (410). For example, the smart bar lock 150 may receive an instruction to open the sliding door while the smart bar lock 150 is in the unlocked position. The process 400 includes moving a pole from a vertical position into a horizontal position (420). For example, in response to determining that the smart bar lock 150 is in a state of unlocked, the smart bar lock 150 may move the pole from the vertical position into the horizontal position. The process 400 includes coupling the pole to the sliding door (430). For example, the latch 156 in the pole 152 may be mechanically biased to connect to the catch of the sliding door 110 once the pole 152 is in the horizontal position. In another example, the latch 156 in the pole 152 may be moved by an actuator to connect to the catch of the sliding door 110 once the pole 152 is in the horizontal position. The process 400 includes moving the pole into the vertical position while the door is coupled to the sliding door (440). For example, the smart bar lock 150 may move the pole 152 from the horizontal position to the vertical position once the latch 156 is connected to the catch in the sliding door 110. The process 400 includes decoupling the pole from the door (450). For example, the smart bar lock 150 may determine that the pole 152 has been moved to the vertical position and, in response, disconnect the latch 156 from the catch.

In some implementations, a smart bar lock includes a pole with a length that corresponds to a length of an area that a sliding portion of a sliding door slides along, a motorized hinge coupled to an end of the pole, where the motorized hinge is configured to rotate to the pole by the end of the pole, and a processor. The processor is configured to perform operations of determining to lock the sliding door, moving the pole from a vertical position into a horizontal position with the motorized hinge, determining to unlock the sliding door while leaving the sliding door closed, and moving the pole into the vertical position with the motorized hinge.

For example, the smart bar lock 150 includes the pole 152 with the length that corresponds to length of the area that the sliding portion 112 slides along, the motorized hinge 154 coupled to an end of the pole 152, where the motorized hinge 154 is configured to rotate the pole 152 by the end of the pole 152, and a processor. The processor is configured to perform operations of determining to lock the sliding door 110, moving the pole 152 from the vertical position into the horizontal position with the motorized hinge 154, determining to unlock the sliding door 110 while leaving the sliding door 110 closed, and moving the pole 152 into the vertical position with the motorized hinge 154. In some implementations, the processor is included within a housing that includes a motor of the motorized hinge 154.

In some implementations, moving the pole from a vertical position into a horizontal position with the motorized hinge includes rotating the pole ninety degrees with the motorized hinge from the end of the pole from the vertical position to the horizontal position. For example, the pole 152 may be rotated ninety degrees with the motorized hinge 154 from the vertical position shown in FIG. 1A to the horizontal position shown in FIG. 1B.

In some implementations, moving the pole from a vertical position into a horizontal position with the motorized hinge prevents the sliding portion of the sliding door from being slid to open the sliding door. For example, the pole 152 when horizontal as shown in FIG. 1B blocks the sliding portion 112 from sliding to the right to open the sliding door 110.

In some implementations, moving the pole from a vertical position into a horizontal position with the motorized hinge while the sliding door is open causes the pole to push the sliding portion of the door such that the sliding door closes. For example, as shown in FIG. 1C, when the sliding door 110 is at least partially open, the end of the pole 152 opposite from the motorized hinge 154 pushes against the sliding portion 112 so that as the end of the pole 152 moves to the left the sliding portion 112 also moves to the left.

In some implementations, the pole includes a roller on a second end of the pole that is opposite of the end that is coupled to the motorized hinge. For example, the pole 152 may include a roller on an end of the pole 152 that is closest to the sliding portion 112 so that the pole 152 may more smoothly push against and down when moving from the vertical position to the horizontal position.

In some implementations, moving the pole into the vertical position with the motorized hinge enables the sliding portion of the sliding door to slide to open the sliding door.

For example, when the pole 152 is moved from the horizontal position shown in FIG. 1B to the vertical position shown in FIG. 1A the sliding portion 112 may again have room to slide right and open the sliding door 110.

In some implementations, determining to lock the sliding door includes receiving an instruction to lock the sliding door. For example, the processor may receive an instruction to lock the sliding door 110 from a monitor control unit within a home. In some implementations, determining to unlock the sliding door while leaving the sliding door closed includes receiving an instruction to unlock the sliding door. For example, the processor may receive an instruction to unlock the sliding door 110 from a monitor control unit within a home.

In some implementations, the processor is configured to perform the operation of determining that an obstruction is blocking the path of the pole. For example, the processor may determine that the pole 152 is being moved to the horizontal position but is stopping before completely in the horizontal position and, in response, determine that an obstruction is blocking the path of the pole 152. In another example, the system 100 may include an infrared light emitter on one end of the sliding door 110 and an infrared receiver on the other end of the sliding door 110, the processor of the smart bar lock 150 determines when the infrared light emitted by the infrared light emitter is being blocked by the infrared light receiver, and, in response, determines an obstruction is blocking the path of the pole 152. Alternatively, when determining that the infrared light emitted by the infrared light emitter is not being blocked by the infrared light receiver, the processor of the smart bar lock 150 may determine that an obstruction is not blocking the path.

In some implementations, the processor is configured to perform the operation of moving a wire to move the obstruction from the path of the pole before moving the pole. For example, in response to determining a blockage, the smart bar lock 150 may return the pole 152 to the vertical position, then trigger a thin wire at the bottom of the sliding door 110 clockwise and upwards to lift any object out of the path, and then try again moving the pole 152 to the horizontal position.

In some implementations, the processor is configured to perform the operation of moving a spring-loaded shelf to move the obstruction from the path of the pole before moving the pole. For example, in response to determining a blockage, the smart bar lock 150 may return the pole 152 to the vertical position, trigger a spring-loaded shelf to activate and throw/push objects off the track, and then try again moving the pole 152 to the horizontal position.

In some implementations, the processor is configured to perform the operations of determining to open the sliding door while the sliding door is unlocked, moving the pole from the vertical position into the horizontal position, coupling the pole to the sliding door, moving the pole into the vertical position while the door is coupled to the sliding door, and decoupling the pole from the door. For example, the processor may be configured to move the pole 152 from the vertical position shown in FIG. 1A to the horizontal position shown in FIG. 1B, couple the pole 152 to the sliding portion 112, and then move the pole 152 back to the vertical position, where FIG. 1D shows the pole 152 partially having returned to the vertical position.

In some implementations, coupling the pole to the sliding door includes coupling a latch in the pole with a catch in the sliding portion of the sliding door. For example, FIG. 1D shows the latch 156 coupled to a catch in the sliding portion 112 of the sliding door 110.

In some implementations, coupling the pole to the sliding door includes coupling a catch in the pole with a latch in the sliding portion of the sliding door. For example, the latch 156 shown in FIG. 1D may instead be on the sliding portion 112 and the catch may be instead be on the end of the pole that the latch 156 is shown on in FIG. 1D.

In some implementations, decoupling the pole from the door includes decoupling a latch in the pole from a catch in the sliding portion of the sliding door. For example, once the pole 152 returns to the open position shown in FIG. 1A, the latch 156 in the pole 152 may be decoupled.

In some implementations, the processor is configured to perform the operations of determining to open the sliding door while the sliding door is locked, moving the pole into the vertical position while the door is coupled to the sliding door, and decoupling the pole from the door. For example, the processor may move the pole 152 from the horizontal position shown in FIG. 1B to the open position shown in FIG. 1A while the latch 156 is coupled to catch.

In some implementations, the pole is the same length as the length of the area that the sliding portion of the sliding door slides along. For example, the pole 152 is the same length as the length of the area that the sliding portion 112 slides along.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A smart bar lock comprising:
a pole with a length that corresponds to a length of an area along which a sliding portion of a sliding door slides;
a motorized hinge coupled to a first end of the pole and configured to rotate to the pole by the first end of the pole;
a coupling on a second end of the pole that is opposite the first end; and
a processor that is configured to perform operations of:
determining to lock the smart bar lock and maintain the sliding door in a closed position;
moving the pole from a vertical position into a horizontal position with the motorized hinge;
determining to unlock the smart bar lock and enable the sliding door to be opened;
moving the pole into the vertical position with the motorized hinge;
determining to change a position of the sliding door, the position comprising at least one of an open position or the closed position;
in response to determining to change the position of the sliding door:
attaching the coupling to a corresponding component on the sliding portion of the sliding door; and
causing, using the motorized hinge, the pole to change the position of the sliding portion of the sliding door from a first position to a second position.

2. The smart bar lock of claim 1, wherein moving the pole from the vertical position into the horizontal position with the motorized hinge comprises:
rotating, using the motorized hinge, the pole ninety degrees with the motorized hinge from the first end of the pole from the vertical position to the horizontal position.

3. The smart bar lock of claim 1, wherein:
determining to lock the smart bar lock and maintain the slide door in the closed position occurs while the sliding door is at least partially open; and
moving the pole from the vertical position into the horizontal position with the motorized hinge while the sliding door is at least partially open causes the pole to push the sliding portion of the sliding door such that the sliding door closes.

4. The smart bar lock of claim 1, wherein determining to lock the smart bar lock and maintain the sliding door in the closed position comprises:
receiving, from an external device, an instruction to lock the sliding door.

5. The smart bar lock of claim 1, wherein determining to unlock the smart bar lock and enable the sliding door to be opened comprises:
receiving, from an external device, an instruction to unlock the sliding door.

6. The smart bar lock of claim 1, wherein the processor is configured to perform the operation of:
determining that an obstruction is blocking a path of the pole.

7. The smart bar lock of claim 6, wherein the processor is configured to perform the operation of:
moving a wire to move the obstruction from the path of the pole before moving the pole.

8. The smart bar lock of claim 6, wherein the processor is configured to perform the operation of:
  moving a spring loaded shelf to move the obstruction from the path of the pole before moving the pole.

9. The smart bar lock of claim 1, wherein:
  determining to change the position of the sliding door comprises determining to open the sliding door while the pole is in a vertical position;
  attaching the coupling to the corresponding component on the sliding portion of the sliding door comprises:
    moving the pole from the vertical position into the horizontal position;
    coupling the pole to the sliding door; and
  causing, using the motorized hinge, the pole to change the position of the sliding portion of the sliding door from the first position to the second position comprises moving the pole into the vertical position while the pole is coupled to the sliding door, the processor is configured to perform the operations comprising:
  decoupling the pole from the sliding door.

10. The smart bar lock of claim 9, wherein coupling the pole to the sliding door comprises:
  coupling a latch in the pole with a catch in the sliding portion of the sliding door.

11. The smart bar lock of claim 9, wherein coupling the pole to the sliding door comprises:
  coupling a catch in the pole with a latch in the sliding portion of the sliding door.

12. The smart bar lock of claim 9, wherein decoupling the pole from the sliding door comprises:
  decoupling a latch in the pole from a catch in the sliding portion of the sliding door.

13. The smart bar lock of claim 1, wherein:
  determining to change the position of the sliding door comprises determining to open the sliding door while the pole is in a horizontal position; and
  causing, using the motorized hinge, the pole to change the position of the sliding portion of the sliding door from the first position to the second position comprises moving the pole into the vertical position while the pole is coupled to the sliding door, the processor is configured to perform the operations comprising:
  decoupling the pole from the sliding door.

14. The smart bar lock of claim 1, wherein the pole is approximately the same length as the length of the area that the sliding portion of the sliding door slides along.

15. A smart bar lock comprising:
  a pole with a length that corresponds to a length of an area along which a sliding portion of a sliding door slides and has a first end and a second end, wherein the pole includes a roller on the second end of the pole;
  a motorized hinge coupled to the first end of the pole and configured to rotate to the pole by the first end of the pole; and
  a processor that is configured to perform operations of:
    determining to lock the smart bar lock and maintain the sliding door in a closed position;
    moving the pole from a vertical position into a horizontal position with the motorized hinge;
    determining to unlock the smart bar lock and enable the sliding door to be opened; and
    moving the pole into the vertical position with the motorized hinge.

16. A smart bar lock comprising:
  a pole with a length that corresponds to a length of an area along which a sliding portion of a sliding door slides and has a first end and a second end;
  a motorized hinge coupled to an end of the pole and configured to rotate to the pole by the end of the pole; and
  a processor that is configured to perform operations of:
    determining to lock the smart bar lock and maintain the sliding door in a closed position;
    moving the pole from a vertical position into a horizontal position with the motorized hinge;
    determining to unlock the smart bar lock and enable the sliding door to be opened;
    moving the pole into the vertical position with the motorized hinge;
    determining that an obstruction is blocking a path of the pole; and
    in response to determining that an obstruction is blocking the path of the pole, moving a wire or a shelf to move the obstruction from the path of the pole before moving the pole.

\* \* \* \* \*